United States Patent [19]
Majchrzak et al.

[11] Patent Number: 5,883,451
[45] Date of Patent: Mar. 16, 1999

[54] DEVICE FOR SUPPORTING AN ELECTRIC MOTOR DRIVING A TURBINE

[75] Inventors: Jean-Pierre Majchrzak, Le Port Marly; Frédéric Houache, Levis St. Nom; Philippe Delire, Braine L'alleud, all of France

[73] Assignee: Valeo Climatisation, Verriere, France

[21] Appl. No.: 809,387

[22] PCT Filed: Jul. 19, 1996

[86] PCT No.: PCT/FR96/01144

§ 371 Date: Jul. 2, 1997

§ 102(e) Date: Jul. 2, 1997

[87] PCT Pub. No.: WO97/04516

PCT Pub. Date: Feb. 6, 1997

[30] Foreign Application Priority Data

Jul. 21, 1995 [FR] France ................................ 95 08892

[51] Int. Cl.$^6$ .............................. H02K 9/00; H02K 5/20
[52] U.S. Cl. .............................. 310/89; 310/58; 310/59; 310/60 R; 310/60 A; 310/91
[58] Field of Search .............................. 310/58, 59, 60 R, 310/60 A, 62, 63, 64, 65, 43, 89, 91

[56] References Cited

U.S. PATENT DOCUMENTS

| | | | |
|---|---|---|---|
| 3,502,916 | 3/1970 | Stavrache et al. .................... | 310/59 |
| 3,624,433 | 11/1971 | Jaeschke ................................ | 310/67 |
| 4,128,364 | 12/1978 | Papst et al. ........................... | 417/354 |
| 4,668,887 | 5/1987 | D'Argouges et al. ................. | 310/154 |
| 4,908,538 | 3/1990 | Geberth, Jr. .......................... | 310/59 |
| 5,073,736 | 12/1991 | Gschwender et al. ................ | 310/88 |
| 5,244,275 | 9/1993 | Bauer et al. ........................... | 366/314 |
| 5,375,651 | 12/1994 | Colwell ................................. | 165/47 |
| 5,616,973 | 4/1997 | Khazanov et al. .................... | 310/54 |
| 5,698,913 | 12/1997 | Yagi et al. ............................. | 310/58 |

FOREIGN PATENT DOCUMENTS

| | | |
|---|---|---|
| 0 293 277 | 11/1988 | European Pat. Off. . |
| 0 564 938 | 10/1993 | European Pat. Off. . |
| 2 412 976 | 3/1994 | France . |

*Primary Examiner*—Thomas M. Dougherty
*Assistant Examiner*—Tran N Nguyen
*Attorney, Agent, or Firm*—Morgan & Finnegan, L.L.P.

[57] ABSTRACT

The invention concerns a device for supporting an electric motor driving a turbine. The device having a cage delimiting a housing for receiving the motor casing, this housing including a peripheral wall connected to a front wall, the peripheral wall being interrupted in order to define at least one channel for cooling the motor, the peripheral wall having at least two U-shaped folded lugs directed towards the inside of the housing and able to come into abutment against the casing of the motor.

25 Claims, 4 Drawing Sheets

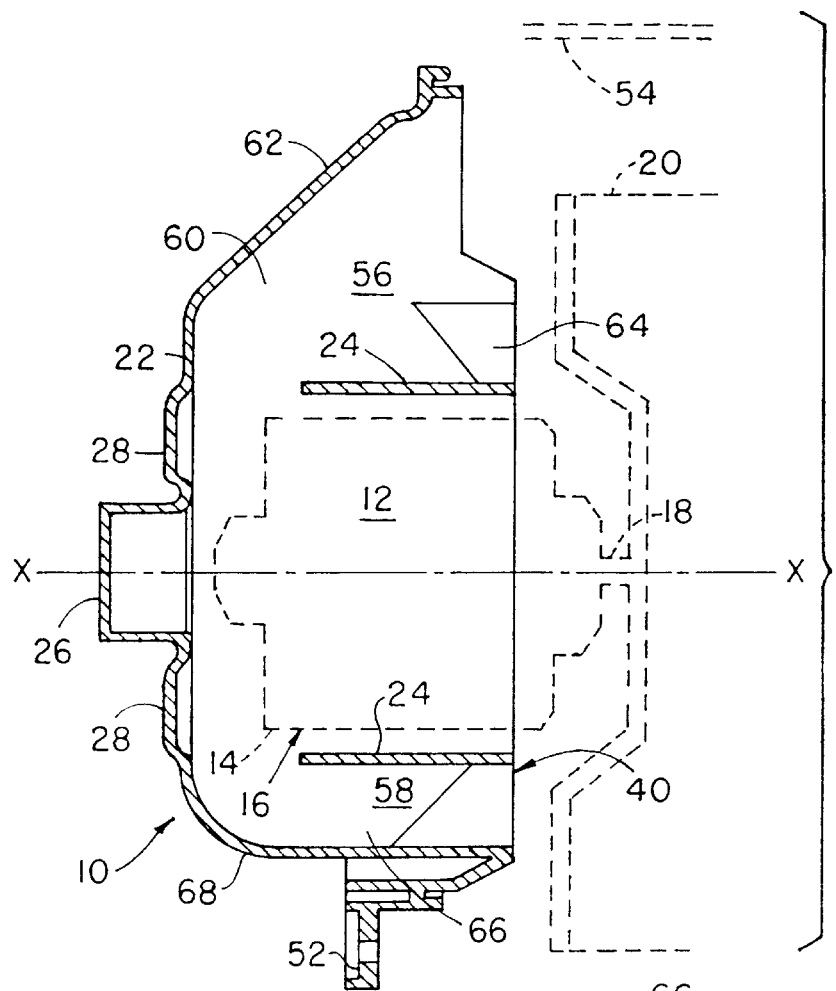
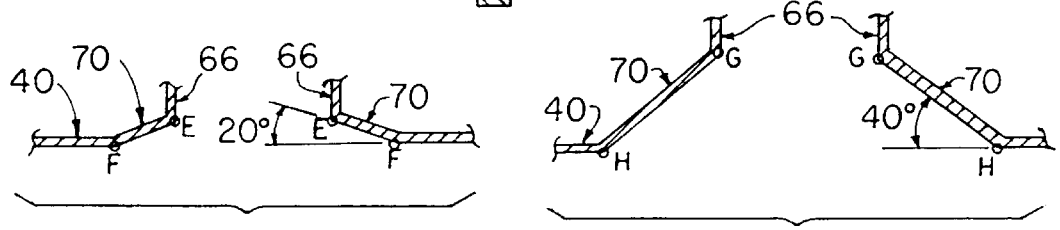
FIG. 4
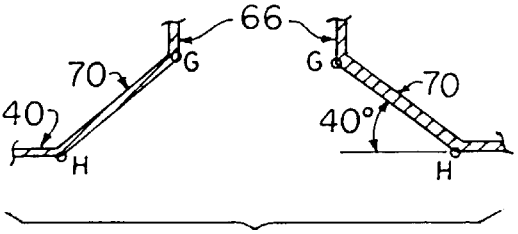
FIG. 5

DEVICE FOR SUPPORTING AN ELECTRIC MOTOR DRIVING A TURBINE

BACKGROUND OF THE INVENTION

The invention concerns a device for supporting an electric motor driving a turbine, notably for heating and/or air conditioning equipment in a motor vehicle.

It concerns more particularly a device of the type comprising a cage formed so as to delimit a housing for receiving the casing of the motor, which opens out into a shell for receiving the turbine, the housing comprising a base wall connected to a peripheral wall, itself connected to a substantially annular front wall forming part of the shell, and in which the peripheral wall is interrupted in order to define at least one channel for cooling the motor, the said cooling channel being delimited by two opposite lateral walls which extend in a substantially radial direction with respect to the axis of rotation of the motor.

A device of this type is disclosed by the publication FR-A-2 412 976.

The motor/turbine assembly, also referred to as a "motorized fan", is designed to blow out a flow of air coming from outside the passenger compartment of the vehicle or a flow of air recirculated from the passenger compartment in order then to send it into the passenger compartment after having been heated or cooled by a suitable heat exchanger.

The cooling channel or channels formed in the cage supporting the motor are designed to divert a proportion of the air flow moved by the turbine, so as to cool the electric motor. Generally the cage delimits two opposite cooling channels. As a result of this a proportion of the air flow enters a channel which serves as an air inlet, then sweeps the parts of the motor to be cooled and is discharged through the other channel, which serves as a discharge channel.

The support devices known up to the present time do not always give complete satisfaction since they very often generate a high noise level, which impairs the comfort of use of the heating and/or air conditioning equipment.

This noise level is due partly to the acoustic radiation from the support and shell excited by the vibrations generated by the motor, and partly to the turbulences in the air flow which enter the cooling channels.

Moreover, they do not provide correct guidance of the air flow used for cooling the electric motor.

Another problem associated with this type of device lies in the fact that it is necessary, on each occasion, to provide a different cage according to the direction of rotation of the turbine, the latter being dependent on the vehicle on which the heating and/or air conditioning equipment is to be installed. This is because, up to the present time, it is necessary to provide different directions of rotation depending on whether the equipment is intended for a vehicle with right-hand drive or a vehicle with left-hand drive, or according to the internal arrangement of the components making it up.

BRIEF SUMMARY OF THE INVENTION

The aim of the invention is notably to overcome the aforementioned drawbacks.

To this end it proposes a device of the type defined in the introduction in which the peripheral wall has at least two U-shaped folded lugs, directed towards the inside of the housing and able to come into abutment against the outer casing of the motor.

These lugs decouple and dampen the vibration emitted by the motor and thus prevent the transmission of this vibration to the device and prevent noise being generated in the passenger compartment of the motor vehicle.

The invention thus makes it possible to omit rubber dampers and their holding rings which were up to the present time necessary, which notably makes it possible to eliminate the damper fitting operations.

In a preferred embodiment of the invention, the device comprises four folded lugs disposed advantageously at vibration nodes of the motor.

These lugs are preferably produced in the form of elastic blades moulded in one piece with the peripheral wall.

According to another aspect of the invention, at least one of the two lateral walls of the cooling channel is connected to the annular front wall by an inclined deflector wall.

Whereas up to the present time the lateral walls of the cooling channel or channels were connected to the annular front wall along a sharp edge, forming an angle of around 90, the invention provides for this connection to be made, for at least one of the two lateral walls of the channel, by means of a deflector wall forming a kind of evolutive fin.

The presence of this deflector wall thus provides a gentle transition between the annular front wall and the lateral wall of the cooling channel, which improves the guidance of the cooling air flow with regard to both its emission and its discharge.

In a simplified embodiment of the invention, only one of the two lateral walls of the cooling channel or channels is connected to the annular front wall by an inclined deflector wall.

This embodiment is particularly suited to cases where the support is designed to receive a motor driving a turbine in a clearly defined direction of rotation. In such cases, the deflector wall is situated in front of the cooling channel with respect to the direction of rotation of the propeller.

In this simplified embodiment, two deflector walls are thus found, associated respectively with the two cooling channels, in cases where the device has two cooling channels.

In a more elaborate embodiment, the two lateral walls of the cooling channel or channels are each connected to the annular front wall by two deflector walls.

This embodiment is particularly suited to the case of a support which may receive an electric motor driving a turbine equally well in one direction of rotation or the other.

As a result the same support device can be used both for right-hand drive vehicles and for left-hand drive vehicles.

In the latter embodiment, the two deflector walls of a cooling channel advantageously have a configuration which is symmetrical with respect to a radial plane passing through the axis of rotation of the motor and through the middle of the cooling channel.

In a device of the aforementioned type, the annular front wall has a curved inner edge and a curved outer edge.

According to one characteristic of the invention, the deflector wall is connected to the front wall, forming therewith an angle which varies from the curved inner edge to the curved outer edge of the annular front wall.

This connection angle is smaller at the inner edge than at the outer edge.

By way of example, the connection angle at the inner edge is around 20° and the connection angle at the outer edge is around 40°.

According to another characteristic of the invention, the deflector wall is connected to the front wall along a radial edge contained in the plane of the front wall.

The deflector wall is preferably connected to the lateral wall of the cooling channel along a non-radial edge.

The device of the invention preferably comprises two opposite cooling channels.

In the following description, given solely by way of example, reference is made to the accompanying drawings in which:

BRIEF DESCRIPTION OF THE DRAWINGS

FIG. 3 is a view of the device in section along the line III—III in FIG. 1 or FIG. 2;

FIG. 4 is a partial view in section along the broken line F-E-E-F in FIG. 2;

FIG. 5 is a partial view in section along the broken line H-G-G-H in FIG. 2.

DETAILED DESCRIPTION OF THE INVENTION

Figure 1:
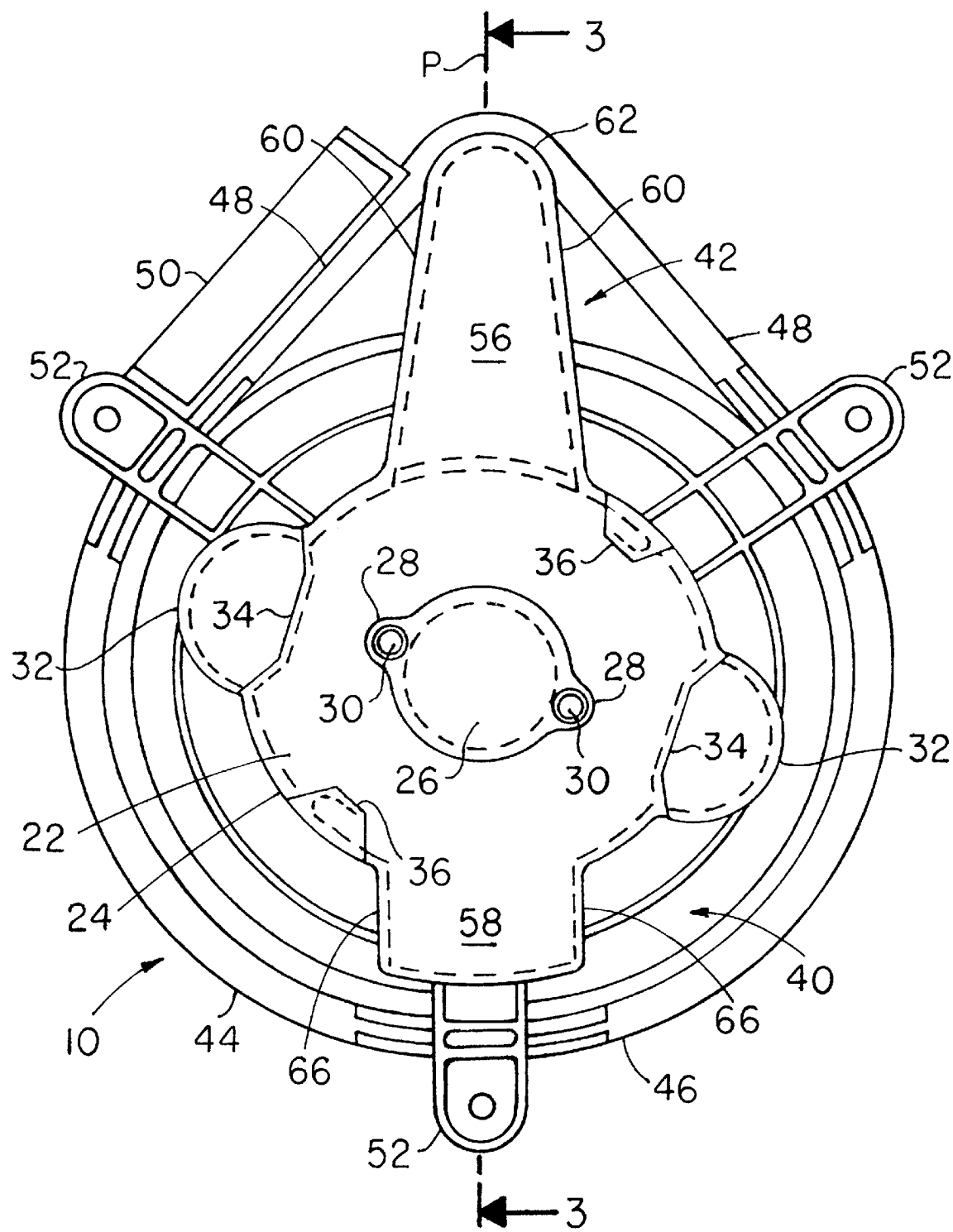
FIG. 1 is a plan view of a support device according to the invention.
Figure 2:
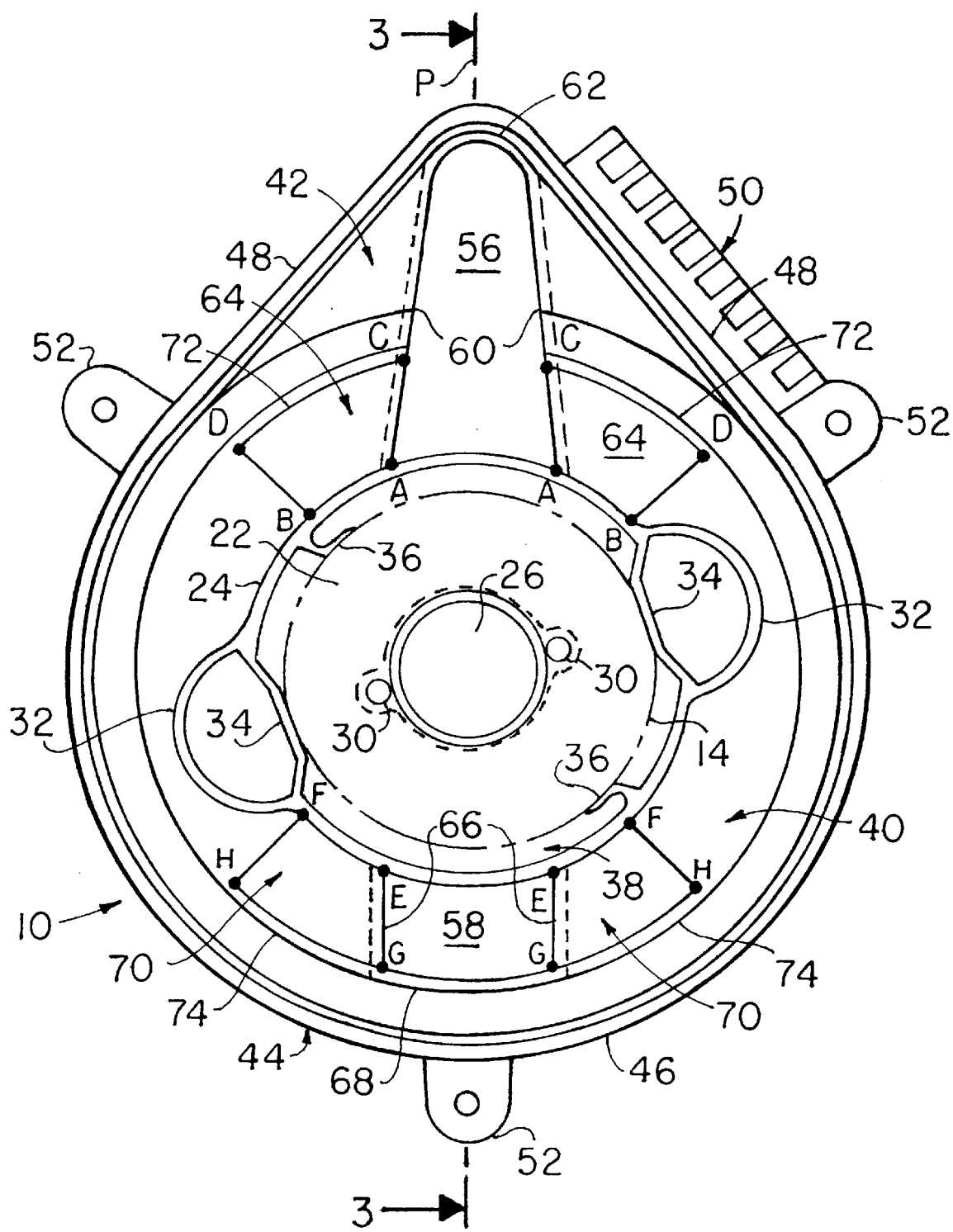
FIG. 2 is a view of this device from below.

The device depicted in FIGS. 1 to 3 comprises a cage 10 obtained by plastic moulding and shaped so as to delimit a housing 12 (FIGS. 2 and 3) able to receive the casing 14 of an electric motor 16. The motor 16 (FIG. 3) comprises a shaft able to be rotated about an axis X—X, and on which a turbine 20 is fixed. The motor/turbine assembly is also referred to as a "motorized fan".

The housing 12 is delimited by a base wall 22 of the cage 10, which is connected to a peripheral wall 24, substantially of circular cylindrical shape about the axis X—X. The base wall 22 has a central protrusion 26 in line with the motor shaft and two lateral protrusions 28 each provided with a hole 30 intended for the passage of a fixing screw or the like (not shown) designed to cooperate with the casing of the motor in order to hold it in the housing and immobilize it both axially and with respect to rotation.

The peripheral wall 24 has two protuberances 32 in the form of brackets disposed in regions diametrically opposed with respect to the axis X—X (FIGS. 1 and 2). These protuberances each delimit a flat 34 (FIGS. 1 and 2) able to come into elastic abutment against the outer casing 14 of the motor. In addition, the peripheral wall 24 has two U-shaped folded lugs 36 directed towards the inside of the housing (FIGS. 1 and 2) and also able to come into abutment against the outer casing 14 of the motor.

The folded lugs 36 are produced in the form of elastic blades moulded in one piece with the peripheral wall 24.

As a result the motor is immobilized radially with respect to the peripheral wall 24, while providing an annular passage 38 between the casing of the motor and this peripheral wall.

The peripheral wall 24 is also connected to a front wall 40 of annular shape overall, having a radial extension 42.

The front wall 40 is provided with a rim 44 with a part 46 having substantially the shape of an arc of a circle extending over three quarters of a circumference, this part 46 being connected to two substantially rectilinear parts 48 extending approximately at 90 from each other and bordering the extension 42.

On one of the two parts 48 of the rim 46 there is formed a lug 50 serving as a support for the pins (not shown) of a connector.

Moreover, as from the peripheral rim 44, three lugs 52 are formed, serving to fix the support 10 to a shell cage 54 depicted partially in FIG. 3 and suitable for receiving the turbine 20.

Thus the front wall 40 and cage 54 together delimit the shell receiving the turbine.

The peripheral wall 24 and front wall 40 are interrupted, in two diametrically opposed regions, so as to define two opposite channels serving to cool the electric motor 16.

These two channels comprise an inlet channel 56 disposed in the region of the extension 42 and a discharge channel 58 disposed in the opposite region.

The inlet channel 58 is delimited by two opposite lateral walls 60 which extend in a substantially radial direction with respect to the axis of rotation of the motor and which are connected to the peripheral wall 24 and to the front wall 40, including at its extension 42.

The two lateral walls 60 are also connected together by a curved wall 62 which extends from the extension 42 as far as the base wall 22.

As can be seen better in FIGS. 2 and 3, each of the lateral walls 60 is connected to the front wall 40 by an inclined deflector wall 64.

These two deflector walls have a symmetrical configuration with respect to a radial plane P (FIGS. 1 and 2) passing through the axis of rotation X—X of the motor and also passing through the middle of the channel 56.

The deflector walls 64 fulfill the role of fins facilitating the guidance of an air flow taken from the shell and designed to enter the cage through the air inlet channel 56 in order then to come into contact with the casing 14 of the motor, and more particularly the moving components thereof (brush and collector), in order to cool them and then return to the shell through the discharge channel 58, as depicted by the arrows in FIG. 3.

The discharge channel 58 is delimited by two lateral walls 66 which are connected to the peripheral wall 24 and to the front wall 40 and which extend in substantially radial directions with respect to the axis of rotation of the motor.

These two walls 66 are also connected together by a curved end wall 68, which extends from the front wall 40 as far as the base wall 22.

The two lateral walls 66 are connected to the front wall 40 by two inclined deflector walls 70 of symmetrical configuration with respect to the radial plane P, which also passes through the middle of the cooling channel 58.

As can be seen in FIG. 2, each deflector wall 64 has an inner edge AB in the form of an arc of a circle connected to the peripheral wall 24, and an outer edge CD in the form of an arc of a circle connected to the front wall 40 by means of a curved wall 72. Each deflector wall 64 is connected to the front wall 40 along a radial edge BD and is connected to the lateral wall 60 along a non-radial edge AC.

The radial edge BD is contained in the plane of the front wall 40, while the edge AC is not situated in this plane.

The deflector wall 64 forms, with the front wall 40, an evolutive angle. The inner edge AB is connected with the front wall 40, forming an angle of around 20°, while the outer edge CD is connected to the front wall 40, forming an angle of around 40°. Thus each of the fins 64 moves progressively away from the plane of the front wall so as to be connected to the corresponding lateral wall 60.

Each deflector wall 64 thus affords a gentle transition between the front wall 40 and the wall 60.

The deflector walls 70 have a similar configuration to the deflector walls 64. Each wall 70 is delimited by an inner curved edge EF connected to the peripheral wall 24 and an outer curved edge GH connected to the front wall 40 by a curved wall 74. Each deflector wall 70 is connected to the front wall 40 along a radial edge FH and is connected to the wall 66 of the channel 68 along a non-radial edge EG.

The angle of connection of each deflector wall 70 with the front wall 40 is 20° at the inner edge EF (FIG. 4) and 40° at the outer edge GH (FIG. 5).

There again, the deflector walls 70 afford a gentle transition between the front wall 40 and the lateral walls 66 of the channel 58, facilitating the guidance of the air flow after cooling of the motor.

The presence of the deflector walls 64 around the inlet channel 56 and of the deflector walls 70 around the discharge channel 58 not only facilitates the guidance of the air flow serving to cool the electric motor, but also reduces the operating noise level of the motorized fan.

Moreover, another advantage lies in the fact that the cage 10 can be used whatever the direction of rotation of the motor and turbine.

Reference will now be made to the embodiment in FIG. 6, which is related to that of FIGS. 1 to 5, the common elements being designated by the same numerical references.

Figure 6:
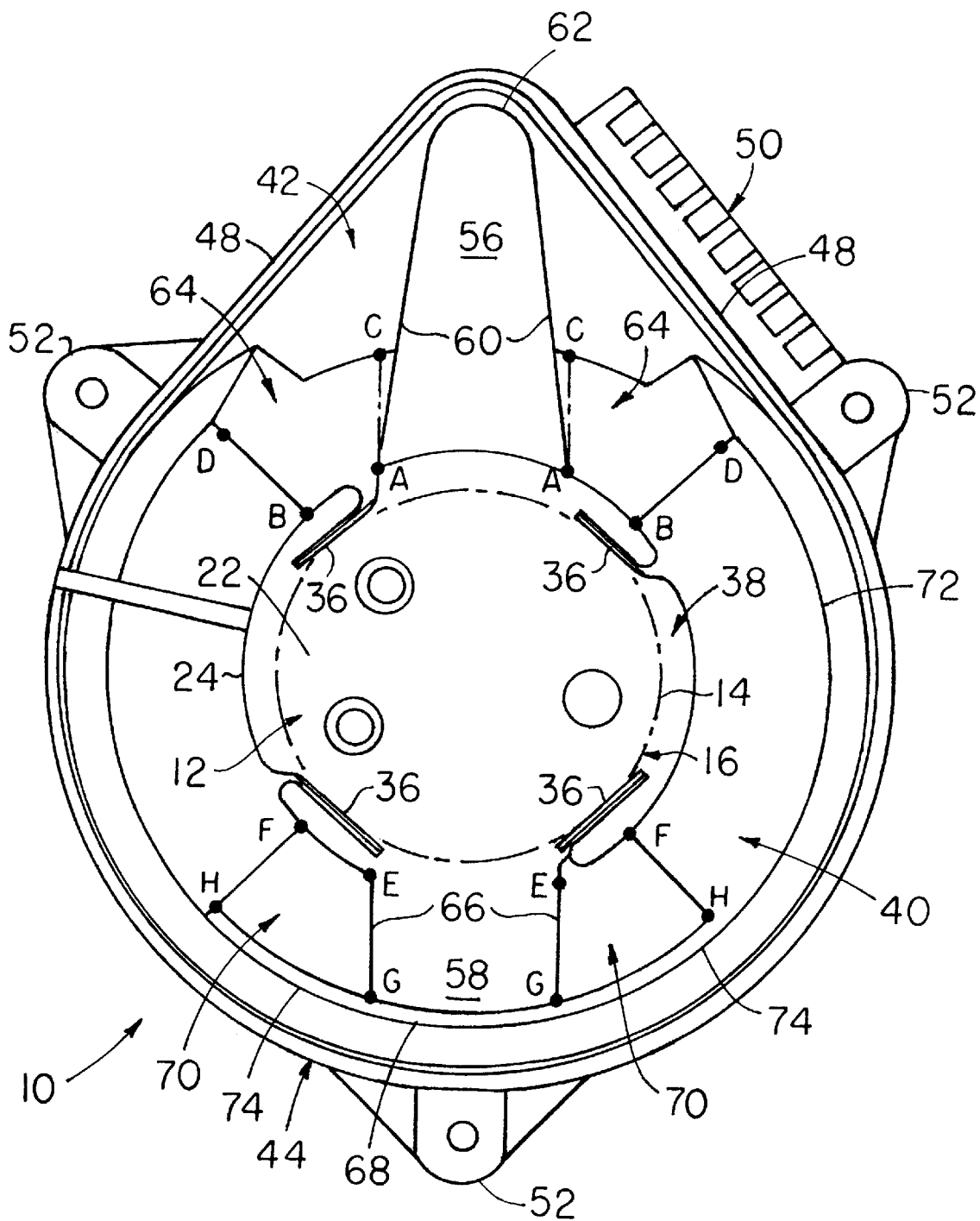
FIG. 6 is a view similar to that of FIG. 2, in another embodiment of the invention.

In the embodiment in FIG. 6, the peripheral wall 24 has four folded lugs 36, in a U shape, with a structure similar to that of the two folded lugs 36 depicted in FIG. 2.

The four folded lugs 36 are directed towards the inside of the housing 12 and, as in the previous embodiment, these four folded lugs 36 are produced in the form of elastic blades moulded in one piece with the peripheral wall. These lugs are advantageously situated at vibration nodes of the motor, which prevents the transmission of the vibration emitted by the motor and consequently prevents noise being generated in the passenger compartment of the vehicle.

Thus it is no longer necessary to have recourse to rubber dampers and plastic rings in order to damp the motor, as was the case in the prior art. This also eliminates the operations of fitting the dampers, and standardizes the device, with a reduction in the number of types of motor support.

Naturally the invention is not limited to the embodiment described previously by way of example.

Although the motor is preferably held by four U-shaped folded lugs, it would be possible, as a variant, to provide only three folded lugs, disposed substantially at 120°0 to each other.

It is also possible to combine U-shaped lugs and flats, as in the first embodiment cited.

In a simplified version, it is possible to provide only one deflector wall per cooling channel, provided that the cage is adapted to receive a motor rotating in a given direction.

It is also possible to give other shapes to the inclined deflector walls, notably with regard to the values of the angle of connection with the front wall.

The device of the invention mainly finds an application with motorized fans used in the heating and/or air conditioning equipment of motor vehicles.

We claim:

1. A device for supporting an electric motor driving a rotatable turbine, the motor having an axis of rotation and vibration nodes, comprising a cage formed to delimit a housing for receiving a casing for the motor, said casing having an external surface, the housing having a base wall, a peripheral wall connected to said base wall, a substantially annular wall connected to said peripheral wall forming part of a shell, and in which said peripheral wall is interrupted in order to define at least one cooling channel for cooling the motor, and two opposite lateral walls connected to the peripheral wall which extend in a substantially radial direction with respect to the axis of rotation of the motor to delimit said cooling channel, wherein said peripheral wall has at least two folded lugs directed towards the inside of the housing and abutting said casing of the motor, and at least one of said two lateral walls of said cooling channel being connected to said substantially annular wall by an inclined deflector wall.

2. A device according to claim 1, further comprisings folded lugs dispose at the motor vibration nodes.

3. A device according to claim 2, wherein said folded lugs further comprise elastic blades molded in one piece with said peripheral wall.

4. A device according to claim 1, wherein said folded lugs further comprise elastic blades molded in one piece with said peripheral wall.

5. A device according to claim 4, further comprising an inclined deflector wall, at least one of said two lateral walls of said cooling channel being connected to said substantially annular wall by at least one of said two inclined deflector wall.

6. A device according to claims 1, further comprising an inclined deflector wall, at least one of said two lateral walls of said cooling channel being connected to said substantially annular wall by at least one of said two inclined deflector walls.

7. A device according to claim 6, wherein said two inclined deflector walls of said cooling channel being situated in front of said channel with respect to the direction of rotation of the turbine.

8. A device according to claim 7, wherein said two lateral walls of said cooling channel are each connected to said substantially annular wall by said two deflector walls.

9. A device according to claim 6, wherein said two inclined deflector walls of said cooling channel is situated in front of said channel with respect to the direction of rotation of the turbine.

10. A device according to claim 1, further comprising at least two deflector walls and wherein said two lateral walls of said cooling channel are each connected to said substantially annular wall by said at least two deflector walls.

11. A device according to claim 6, wherein said at least two deflector walls of said cooling channel further comprise a radial plane passing through the axis of rotation of the motor and passing through the middle of said cooling channel, said at least two deflector walls having a symmetrical configuration with respect to said radial plane.

12. A device according to claim 11, wherein said substantially annular wall has an inner curved edge and an outer curved edge, wherein said at least two deflector walls being connected to said substantially annular wall, forming therewith an angle of connection which varies from said inner edge to said outer edge.

13. A device according to claim 1, wherein said substantially annular wall has an inner curved edge and an outer curved edge, said deflector wall connected to said substantially annular wall, forming therewith an angle of connection, which varies from said inner curved edge to said outer curved edge.

14. A device according to claim 13, wherein said angle of connection at said inner curved edge is smaller than at said outer edge.

15. A device according to claim 14, wherein said angle of connection at said inner curved edge is around 20° and said angle of connection at said outer curved edge is around 40°.

16. A device according to claim 15, wherein said substantially annular wall further comprises a radial edge, and said deflector wall is connected to said substantially annular wall along said radial edge.

17. A device according to claim 1, further comprising a deflector wall, wherein said substantially annular wall further comprises a radial edge, and said deflector wall connected to said substantially annular wall along said radial edge.

18. A device according to claim 17, wherein said deflector walls being connected to said lateral wall of said cooling channel along a non-radial edge thereof.

19. A device according to claims 1, further comprising a deflector wall, said deflector walls being connected to said lateral wall of said cooling channel along a non-radial edge thereof.

20. A device according to claim 9, wherein said peripheral wall is interrupted in order to define two opposite cooling channels.

21. A device according to claim 1, wherein said peripheral wall is interrupted in order to define two opposite cooling channels.

22. A device for supporting an electric motor driving a rotatable turbine, the motor having an axis of rotation and vibration nodes, comprising a cage formed to delimit a housing for receiving a casing for the motor, said casing having an external surface, the housing having a base wall, a peripheral wall connected to said base wall, a substantially annular wall connected to said peripheral wall forming part of a shell, and in which said peripheral wall is interrupted in order to define at least one cooling channel for cooling the motor, and two opposite lateral walls connected to the peripheral wall, wherein said lateral walls extend in a substantially radial direction with respect to the axis of rotation of the motor to delimit said cooling channel, wherein said peripheral wall has at least two folded lugs directed towards the inside of the housing and abutting said casing of the motor, and at least two deflector walls and said two lateral walls are each connected to said substantially annular wall by said two deflector walls.

23. A device for supporting an electric motor driving a rotatable turbine, the motor having an axis of rotation and vibration nodes, comprising a cage formed to delimit a housing for receiving a casing for the motor, said casing having an external surface, the housing having a base wall, a peripheral wall connected to said base wall, a substantially annular wall connected to said peripheral wall forming part of a shell, and in which said peripheral wall is interrupted in order to define at least one cooling channel for cooling the motor, and two opposite lateral walls connected to the peripheral wall, wherein said lateral walls extend in a substantially radial direction with respect to the axis of rotation of the motor to delimit said cooling channel, wherein said peripheral wall has at least two folded lugs directed towards the inside of the housing and abutting said casing of the motor, and wherein said substantially annular wall has an inner curved edge and an outer curved edge, a deflector wall connected to said substantially annular wall, forming therewith an angle of connection which varies from said inner curved edge to said outer curved edge.

24. A device for supporting an electric motor driving a rotatable turbine, the motor having an axis of rotation and vibration nodes, comprising a cage formed to delimit a housing for receiving a casing for the motor, said casing having an external surface, the housing having a base wall, a peripheral wall connected to said base wall, a substantially annular wall connected to said peripheral wall forming part of a shell, and in which said peripheral wall is interrupted in order to define at least one cooling channel for cooling the motor, and two opposite lateral walls connected to the peripheral wall, wherein said lateral walls extend in a substantially radial direction with respect to the axis of rotation of the motor to delimit said cooling channel, wherein said peripheral wall has at least two folded lugs directed towards the inside of the housing and abutting said casing of the motor, and wherein said substantially annular wall further comprises a radial edge, and a deflector wall connected to said substantially annular wall along said radial edge contained in the plane of the front wall.

25. A device for supporting an electric motor driving a rotatable turbine, the motor having an axis of rotation and vibration nodes, comprising a cage formed to delimit a housing for receiving a casing for the motor, said casing having an external surface, the housing having a base wall, a peripheral wall connected to said base wall, a substantially annular wall connected to said peripheral wall forming part of a shell, and in which said peripheral wall is interrupted in order to define at least one cooling channel for cooling the motor, and two opposite lateral walls connected to the peripheral wall, wherein said lateral walls extend in a substantially radial direction with respect to the axis of rotation of the motor to delimit said cooling channel, wherein said peripheral wall has at least two folded lugs directed towards the inside of the housing and abutting said casing of the motor, and a deflector wall being connected to said lateral wall of said cooling channel along a non-radial edge thereof.

* * * * *